Figure 1:
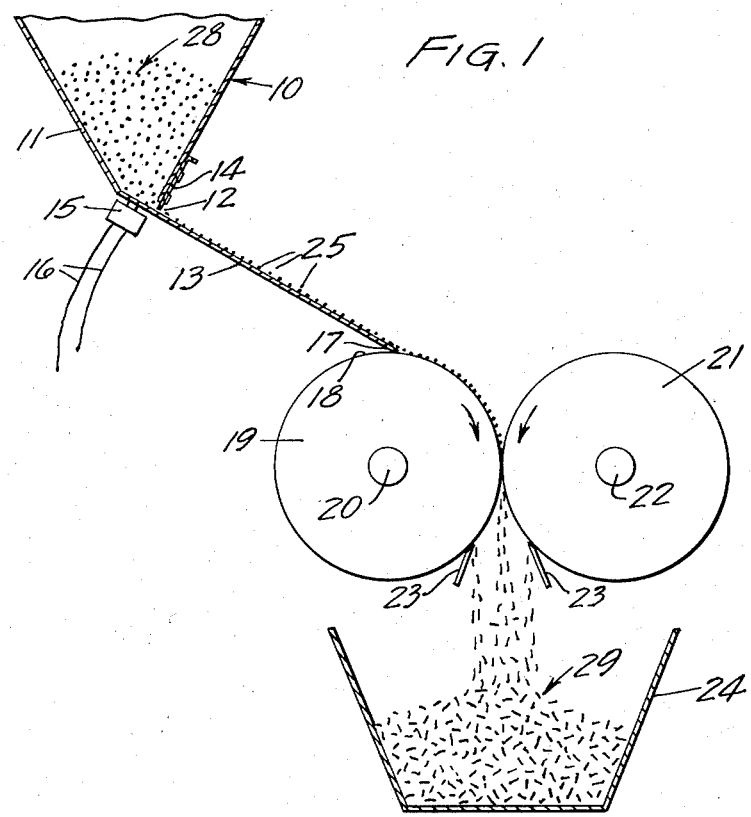

Oct. 14, 1958  J. H. FORKNER  2,856,287
METHOD OF PREPARING FOOD PRE-MIX
CONTAINING FLAVOR PARTICLES
Filed Dec. 21, 1955

INVENTOR.
JOHN H. FORKNER
BY
Williamson, Schroeder, Adams & Meyers
ATTORNEYS

United States Patent Office 2,856,287
Patented Oct. 14, 1958

2,856,287

METHOD OF PREPARING FOOD PRE-MIX CONTAINING FLAVOR PARTICLES

John H. Forkner, Fresno, Calif., assignor to Pillsbury Mills, Inc., Minneapolis, Minn., a corporation of Delaware Application December 21, 1955, Serial No. 554,530

5 Claims. (Cl. 99—94)

This invention relates to an improved dry food pre-mix or component thereof containing pre-sized flavor particles of a somewhat sticky and cohesive nature and to a method for specially treating the particles.

The value of flavor particles in food products such as cakes has been recognized for many years. Where it is desired not only to flavor the food product but to give it a pleasing appearance and to make the presence of the particles known visually, it has become the practice to employ flavoring particles of contrasting color and of small size so that, when the food product is cut and served, there will be greater likelihood of individually dispersed particles being visibly exposed at the plane of cutting. Thus, for such purpose I have successfully produced stabilized fruit-like particles which are first cracked into small pieces resembling crystals and then are mixed into such food product as a cake pre-mix for producing an excellent cake. If the pre-mix is to be mixed into a dough or heavy batter, the specific gravity of the flavor particles is not particularly important since the distribution of the particles at the time the mixing or stirring operation was stopped determines their relative positioning in the ultimate food product. However, if the flavoring particles have a high specific gravity and if the batter stage of the product has a relatively low viscosity with respect to that of usual baked products, then the flavor particles will tend to settle when mixing or stirring of the batter is stopped. A greater concentration of the particles will occur near the bottom of the food product in its final form and the advantages of uniform flavoring and pleasing appearance will be lost.

I have found that flavor particles high in sugar content and of a somewhat sticky nature can be so treated as to remain well dispersed even in a relatively thin batter such as produced by commercial bakers for certain types of cakes. I am not dependent upon my results by the dispersion by puffing, fluffing, aerating, or otherwise changing the specific gravity of the particle itself, but rather achieve the desired result by changing the shape of the particle so that it will behave differently when incorporated into a food product, even though such product has a low viscosity batter or fluid stage.

In the present disclosure, I am concerned with flavor particles which have a high sugar content, and, hence, have a certain degree of stickiness or cohesiveness. I have been able in the past to produce cracked particles or crystal-like fragments which will remain substantially free-flowing even though reduced in size to a degree such as to create from 3,000 to 30,000 pieces per pound. Any attempt, however, to deform the pieces while in contact with each other merely causes a gumming or cohesion which immediately frustrates such attempt.

It is, therefore, an important object of this invention to provide a composition of matter which has a dry pulverulent component and a multiplicity of specially processed flavor particles dispersed throughout which, despite a relatively higher specific gravity, will remain dispersed when the composition is reduced to an intermediate fluid state.

It is another object of the invention to provide a method by which pre-sized flavor particles high in sugar can be directly treated to alter their settling characteristics in fluid suspension.

It is a further object of the invention to provide a method of physically working pre-sized flavor particles of the class described while preventing their gumming and cohering.

A still further object of the invention is to provide an improved food product having uniformly dispersed particles of intensified flavor and appearance.

Figure 2:
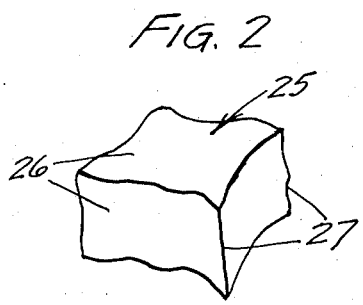
Figure 3:
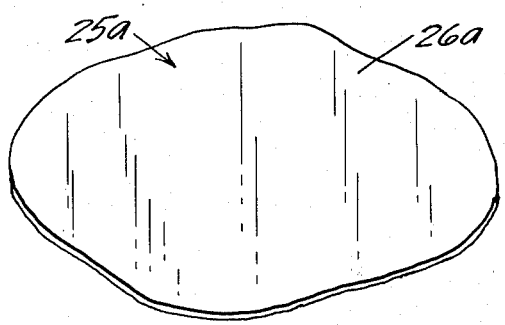

The method by which I change the physical form of the flavor particles is set forth diagrammatically in Figure 1;

Figure 2 shows a characteristic crystal-like fragment of flavoring material high in sugar content, the particle being shown in perspective and greatly enlarged; and Figure 3 is an enlarged view in perspective of the food fragment or particle of Figure 2, after it has been flattened according to my method.

With continued reference to the drawing, Figure 1 sets forth a diagrammatic representation of means for accomplishing a flattening of my flavor particles in such a manner as to produce plate-like particles having the same specific gravity and yet maintained in discrete form without sticking to one another or the equipment. A feed hopper is indicated generally at 10 and consists of a convergent wall structure 11 terminating in a feed opening 12. A feed plate 13 underlies opening 12 and the opening may be regulated by such means as a sliding gate 14. A vibrator 15 may be secured to the feed plate 13 to maintain agitation during use. Electrical lead wires 16 supply electrical energy to the vibrating unit 15. The feed plate 13 terminates at a lip 17 which overlies the crown portion 18 of a roll 19 rotatably mounted on axle 20 and cooperating with roll 21, in turn rotatably mounted on axle 22, as shown in Fig. 1. The rolls rotate in the direction of the arrows in conventional manner and may be driven by means not shown. Also not shown are the mounting bearings for the rolls and the means by which the clearance between the rolls 19 and 21 may be adjusted. Such expedients are, however, old in the art and are not repeated here to avoid redundance. Scraping blades 23 may be positioned below the rolls 19 and 21 for the purpose of separating any particles which accidentally stick to the surface of either of the rolls. A receiving member 24 is disposed beneath the rolls so as to collect particles which have been treated in the method herein disclosed.

The material which I propose to treat is that of a stabilized nature having a pronounced flavor characteristic and a pleasing appearance so that when it is employed as a flavoring additive to such food products as cakes, batter pastries, cooked cereals, gelatin desserts and the like, they will be easily observed and easily tasted when the food product is dished and eaten. The flavoring particles are stabilized so that they will not become dissolved or otherwise disintegrate when incorporated in moist food of the class described. The flavoring particles further have a sugar base and are dried to a point where the particles will not ordinarily cohere without pressure. If pressure is applied, however, the particles will form agglomerates and may even fuse into gummy masses. The technique of subdividing sheeted flavor material high in sugar content forms no part of this application, but is a troublesome problem which has been overcome by me in several manners. The subdivision of the flavor material usually results in a crystal-like fragment 25, as shown in greatly enlarged condition in Fig. 2. Several planes 26 are formed and the fragment or particle is chunk-like in its general configuration and provided with several sharp edges 27, as shown. The present invention contemplates pre-sizing particles of this nature and selecting those which lie generally within the range of 3,000 to 30,000 pieces per pound. Once cracked, it is desirable to keep the particles in a loose and flowing condition so that they do not re-agglomerate or otherwise gum and stick together.

In my method for improving the physical characteristics of the crystal-like flavor particles, I do not alter the specific gravity of the individual crystals or particles, nor do I change the composition thereof. The physical form, however, is changed so as to produce novel results when the changed particles are employed as flavoring additives to food compositions of the class described, all as will be set forth presently in this specification.

Referring again to Fig. 1, a quantity of the crystal-like particles shown in Fig. 2 are placed in the hopper 10 together with a dry pulverulent carrying medium, preferably intermixed therewith and the entire mass being designated generally as 28. Means such as the vibrator 15 cause the mass of material 28 to be fed downwardly on the feed plate 13 and to be evenly deposited from lip 17 upon the crown 18 of roll 19 as it rotates in operation. The dry pulverulent mass together with the crystal-like particles is maintained in dusted relation as it passes over the lip 17 and onto the surface of roll 19. The roll 19 rotates at a lineal surface speed somewhat greater than that of the rate of deposit of material from the feed plate 13. The individual particles 25 tend to separate individually on the feed plate 13 and, as they slide and are carried over the crown of the rotating roll 19, are spaced and separated even to a greater extent. The rolls 19 and 21 are set very close together and flatten each of the individual particles 25 before it has an opportunity to come into contact with a neighboring particle. The carrying medium passes through with the flattened particles and serves to keep them separated all through the process. The flattened particle has the configuration shown in Fig. 3 and is designated generally at 25a. The surface area 26a has been greatly increased and the thickness has been diminished. Although I do not wish to be limited to any particular size of flattened particle, I have found that a good average is ¼ inch in diameter and ¹⁄₃₂ inch thick. Rolls 19 and 21 of 18 inches in diameter were operated at 30 R. P. M. to effect the proper separation of the particles.

The product coming from the roll mill is designated generally at 29 and consists of a multiplicity of the flattened particles 25a of from 3% to 15% moisture with an optimum of 5% to 10% moisture. The flattened particles are still carried by the dry pulverulent material forming a part of the product. In some instances, it may be desirable to remove a portion of the dry pulverulent material, in which case the product 29 may be passed over a simple screen and any portion or all of the dry material can be separated excepting that which clings to the surface of the flattened particles 25a. My invention finds particular use in prepared pre-mixes where the pre-mix or a portion of the pre-mix is utilized as the suspending medium. Thus, in the case of a cake mix, all or a portion of the cake mix itself may be intermixed with the unflattened particles or granules 25 to furnish the starting material 28. The collected material 29 then constitutes the finished pre-mix with the particles 25 flattened into the form shown in Fig. 3. It is understood, of course, that sugar, flour or other individual dry components in various proportions may be employed as a carrying and dusting medium during the flattening process and can be conveniently utilized in the total mix without the necessity of separating it from the particles. As previously pointed out, feeding a multiplicity of the particles 25 into a roll crusher or similar type of apparatus operating in conventional manner will result in gumming and cohesion between the particles. In addition, the roll surfaces and blades also tend to become gummy and soon continued operation becomes impossible. My method of mixing and feeding materials of the class described has completely overcome this difficulty and makes it possible for me to produce flattened particles, as illustrated in Fig. 3, directly in a pre-mix or component thereof.

A characteristic use of my pre-mix mixture lies in the cake and pastry field. The pre-mix is moistened in accordance with conventional instructions, and, where leavening is employed, bubbles will tend to form in the batter. The flavor particles 25a will have increased resistance to settling because of the large area produced in comparison with the weight thereof. In addition, the increased area tends to be supported by small leavening bubbles which actually suspend or even cause some of the particles to rise in the batter. The result is a thorough dispersion of the particles throughout the batter, and this dispersion is maintained during the baking process. When the batter is poured into a cake pan, those particular particles which are near the inner face between the batter and the pan surface tend to become oriented with their flat surfaces exposed outwardly. The finished cake thus presents a pleasing appearance and the particles are clearly visible.

When the food product, such as a cake, is baked and cut, the flat particles, being the same numerically as where the crystal-like formation 25 is employed, will have the same average occurrence at the plane of cutting. Unlike the crystal-like particle or fragment 25, the flattened piece 25a will appear several times larger, and will simulate an actual chunk of fruit or fruit-like material. It is contemplated that the flavor particles be stabilized so as not to dissolve in the batter and, hence, the particles tend to be chewy. The eating characteristics of such chewy flavor particles is highly desirable, but in the finely divided form utilized to increase the occurrences of the particles throughout the food product, the flavor factor of the particles is not presented to full advantage when they are in the form shown in Fig. 2. Now, however, where the same particle is presented in flattened form as in Fig. 3, a greater area comes in contact with, and is dissolved on, the tongue during eating and an intensified flavor reaction is obtained with the same weight of flavoring material.

It may thus be seen that I have been able to improve food products by means of specially treated flavor particles and to that end have invented a new and useful method by which to change the physical form of such particles even though they be sticky or gummy in character.

What I claim is:

1. A method for improving pre-sized compressible sugar base flavor particles having a tendency to cohere under pressure which consists in, admixing and dispersing a quantity of the particles with and in a dry pulverulent carrying medium moving said carrying medium through a predetermined path and thereby maintaining the dispersed relationship of said particles, and flattening each particle in its carrying medium while in movement to increase its surface area while maintaining the individual particles out of contact with one another.

2. A method for improving pre-sized compressible sugar base flavor particles having a tendency to cohere under pressure which consists in, admixing a quantity of the particles into a dry food pre-mix material of substantially smaller particle size, moving said mixture through a predetermined path, and flattening each particle directly in the moving pre-mix to increase the surface area thereof while maintaining the individual particles out of contact with one another through the medium of the moving pre-mix material.

3. A method of producing an improved pre-mix containing dispersed sugar base flavor particles which consists in, pre-sizing crystal-like compressible discrete flavor particles having a tendency to cohere under pressure to a size measuring about 3,000 to 30,000 pieces per pound, admixing a quantity of the pre-sized particles into a dry pulverulent pre-mix material, moving the mixture through a predetermined path, and flattening each particle directly in the pre-mix material while moving to increase the surface area of the particle while maintaining it out of contact with other particles in the pre-mix through the carrying medium of the moving pulverulent material.

4. A method for producing an improved pre-mix containing discrete, pre-sized compressible sugar base flavor particles having a tendency to cohere under pressure which consists in, admixing and dispersing a quantity of the particles with and in a dry pulverulent carrying medium moving said mixture, then feeding said mixture in controlled manner to a faster moving surface against which the particles are maintained out of contact with one another, and then individually flattening each of said particles during the faster travel of said mixture.

5. A method for improving pre-sized compressible sugar base flavor particles having a tendency to cohere under pressure in a roll crusher which consists in feeding continuously a dry pulverulent material of substantially smaller particle size than said particles over the surface of at least one of said rolls, simultaneously depositing upon the top of said roll and at a slower lineal velocity than that of the roll, a dispersed stream of discrete particles, and sliding and further dispersing the particles on the sloping side thereof, then flattening individually said particles in the roll crusher without permitting the flattened particles to stick together.

References Cited in the file of this patent

UNITED STATES PATENTS

| | | |
|---|---|---|
| 1,388,873 | McKay | Aug. 30, 1921 |
| 1,503,547 | Mininberg | Aug. 5, 1924 |
| 2,556,579 | Forkner | June 12, 1951 |
| 2,650,881 | Forkner | Sept. 1, 1953 |
| 2,710,809 | Andrews et al. | June 14, 1955 |